3,351,670
PREPARATION OF p-HALOTETRA-
FLUOROPHENOL
Leon Jerzy Belf, Avonmouth, England, assignor to The
National Smelting Company Limited, London, England
No Drawing. Filed July 25, 1963, Ser. No. 297,692
Claims priority, application Great Britain, July 30, 1962,
29,236/62; Nov. 30, 1962, 43,387/62
6 Claims. (Cl. 260—623)

The invention relates to new chemical compounds containing a highly halogenated phenyl ring and to a method of preparing them.

The invention consists in new chemical compounds of formula X—$C_6F_4$—OH in which X is Cl, Br, or I.

The invention further consists in a method for the preparation of chloro-, bromo-, or iodo-tetrafluorophenol in which pentafluorochloro-, pentafluorobromo-, or pentafluoroiodobenzene is reacted with an alkali metal hydroxide in alcoholic solution.

It will be clear to a man skilled in the art that it is rather surprising that the above reaction should take place at all. Thus, it would have been quite reasonable to expect the reaction to proceed along the lines:

$$C_6F_5Cl + KOH \rightarrow C_6F_5OH$$

instead of the reaction which actually does take place $$C_6F_5Cl + KOH \rightarrow Cl-C_6F_4-OH$$

The invention still further consists in the chloro-, bromo-, or iodotetrafluorophenol made by this method.

In a preferred form of the invention, the alkali metal hydroxide is potassium hydroxide and the alcohol tertiary butanol.

The invention still further consists in a fungistat containing as the active ingredient a chloro-, bromo-, or iodotetrafluorophenol.

The invention will be further described with reference to the following nonlimiting examples:

EXAMPLE 1.—Preparation of chlorotetrafluorophenol

Chloropentafluorobenzene (10.4 g.) in t-butanol (10 cc.) was added during 10 minutes to a stirred suspension of potassium hydroxide pellets (7.7 g.) in t-butanol (50 cc.) at about 80°. The mixture was heated under reflux for 1 hour. Water (200 cc.) was then added to the cold mixture and most of the t-butanol distilled off. The residue was extracted with methylene chloride (2×50 cc.) and this extract was discarded. The aqueous phase was then acidified with sulphuric acid (5 N, 80 cc.), an oil separating out. The oil was extracted with methylene chloride (4×50 cc.), the extract was dried ($CaSO_4$), filtered and the solvent distilled off. The residue, after two distillations through a short Vigreux column gave chlorotetrafluorophenol (4.0 g.), B.P. 176–178°, $n_D^{20}$ 1.4758. (Found: C, 36.3; H, 0.6; Cl, 16.8; F, 37.0. Equivalent wt. (by titration against standard sodium hydroxide) 204. $C_6HClF_4O$ requires: C, 35.9; H, 0.5; Cl, 17.7; F, 37.9. Equivalent wt. 200).

An infrared spectrum of the phenol showed strong absorption bands at 3580 and 3450 cm.$^{-1}$, characteristic of a hydroxyl group.

EXAMPLE 2.—Preparation of bromotetrafluorophenol

Bromopentafluorobenzene (89.0 g.) was added over ½ hour into a well stirred mixture of potassium hydroxide (5.0 g.) in t-butyl alcohol at about 60°. When the addition was complete, the temperature was raised to the reflux temperature and maintained for 2 hours, then water (400 cc.) was added and the alcohol distilled off (temp. of distillation, 80–85°). The aqueous layer was extracted with methylene chloride (2×30 cc.) and then acidified with conc. hydrochloric acid (75 cc.) causing an organic layer to form. This was extracted with methylene chloride (3×100 cc.). The dry extract after evaporation of the solvent was distilled under reduced pressure and the product collected boiling at 145–147°/150 mm. (66.9 g.), yield 75.8%. Bromotetrafluorophenol is a colourless crystalline material melting at about 28–30°. Found: C, 28.9; H, 0.8; F, 30.8; Br, 32.7%. Calculated for $C_6HF_4BrO$: C, 29.1; H, 0.5; F, 31.0; Br, 32.6%.

EXAMPLE 3.—Preparation of iodotetrafluorophenol

Iodopentafluorobenzene (14.7 g., 99%) was added over ½ hour into a well stirred mixture of potassium hydroxide (7 g.) in t-butanol (50 cc.) at about 60°. When the addition was completed, the reaction temperature was raised to the reflux temperature and maintained for 2½ hours, at the end of which water (75 cc.) was added and the t-butyl alcohol distilled off. The aqueous layer was extracted with methylene chloride (2×50 cc.) to remove any of the unreacted starting material. The aqueous phase was then acidified with conc. hydrochloric acid (50 mls.) and extracted with methylene chloride (5×30 cc.). The extract after washing with water (2×50 cc.) was dried over $MgSO_4$, filtered and distilled. After the evaporation of the solvent the residual liquid was distilled under reduced pressure, yielding one fraction, B.P. 95–96°/6 mm. The liquid product solidified at room temperature into a pink crystalline mass (11 g.), M.P. 42–45°. On repeated recrystallisation from petroleum ether (80–100°), a crystalline hydroscopic product was obtained, M.P. 49–49.5°, yield 75%. Found: C, 24.5; H, 0.6; F, 25.5; I, 41.7%. Calculated for $C_6HIF_4O$: C, 24.4; H, 0.3; F, 26.0; I, 43.5%.

EXAMPLE 4.—p-nitrobenzyl-iodotetrafluorophenylether
($IC_6F_4OCH_2C_6H_4NO_2$)

Iodotetrafluorophenol (0.3 g.) and p-nitrobenzyl bromide (0.26 g.) were dissolved in ethanol followed by the addition of potassium hydroxide (0.1 g.) in water (1 ml.). The reaction mixture after refluxing on a water bath for 2 hours was cooled and the precipitated solid filtered off. On recrystallisation from ethanol, a crystalline product (0.2 g.) was obtained, M.P. 147–148°. Found: C, 36.5; H, 1.6; F, 18.0%. Calculated for $C_{13}H_6F_4NO_3I$: C, 36.5; H, 1.4; F, 17.8%.

The product prepared by the method of the above examples is predominantly the para compound but it also contains a small proportion of the ortho compound.

The bromo- compound has a large degree of fungistatic activity against Trichophyton interdigitale, the fungus causing the skin disease known as "athlete's foot." The chloro- and iodo- compounds also show this fungistatic activity. Moreover good fungistatic activity is also shown against, e.g. Aspergillus niger, Andida albicans and Pitysporum ovale. Apart from this, however, compounds of this halogenated type (general formula X—$C_6F_4$—OH where X=Cl, Br or I) provided reactive intermediates for preparing new tetrafluorophenyl compounds, especially polytetrafluorophenylethers, which are particularly heat-stable and radiation stable.

The following figures are given as a comparison of the new compounds with known fungistatics.

1. *Minimum inhibitory concentrations (M.I.C.)*

These are absolute values and indicate the lowest concentration at which the test fungi are totally inhibited. These figures apply to the laboratory test conditions prevailing and in practice some deviation may or may not occur.

| Compound | Aspergillus niger | Candida albicans | Pityrosporum ovale | Trichophyton interdigitale |
|---|---|---|---|---|
| Iodotetrafluorophenol | 62.5 | 31.25 | 62.5 | 3.9 |
| Bromotetrafluorophenol | 62.5 | 31.25 | 31.25 | 3.9 |
| Chlorotetrafluorophenol | 31.25 | 15.6 | 31.25 | 1.9 |
| o-P.P. (o-phenylphenol) | 31.25 | 62.5 | 62.5 | 15.6 |
| P.C.P.(pentachlorophenol) | 13.6 | 3.9 | 15.6 | <1.0 |
| Pentafluorophenol | >500 | >500 |  | >500 |
| Tetrafluorophenol | >500 | >500 |  | >500 |
| p-Bromophenol | 156.0 | 312.0 |  | 156.0 |
| Acetyl DCMX | 31.25 | 62.5 | 500 | 31.25 |
| DCMX (dichloromethaxylenol) | 62.5 | 15.6 | 31.25 | 7.8 |
| 8-OH-quinoline | 7.8 | 3.9 | 7.8 | 3.9 |

2. *Activity in creams*

Each compound was formulated in nonionic based cream to give a final concentration of 0.5%. These test creams were then compared with various proprietary creams by the "zone of inhibition" test.

The results below show the diameter of the resulting zone of inhibition. The diameter of the disc was 15 mm.; therefore this figure (15) represents no activity.

| Cream | Aspergillus niger | Candida albicans | Trichophyton interdigitale | Pityrosporum ovale |
|---|---|---|---|---|
| o-P.P. (orthophenylphenol) | 24 | (15) | 32 |  |
| P.C.P. (pentachlorophenol) | (15) | (15) | 28 |  |
| Acetyl DCMX | (15) | (15) | (15) |  |
| DCMX (dichloromethaxylenol) | (15) | (15) | 18 |  |
| Bromotetrafluorophenol | 16 | 33 | 60 | 33 |
| Iodotetrafluorophenol | 27 | 70 | 64 | 68 |
| Chlorotetrafluorophenol | 16 | 31 | 64 | 30 |
| Cream A | 27 | 28 | 50 | 32 |
| Cream B | (15) | (15) | 24 | (15) |
| Cream C | 16 | (15) | 65 | (15) |
| Cream D | 29 | 28.5 | 48 | 34 |
| Cream E | 16 | 20 | 52 | 26 |

Although the activity of the three fluoro compounds is not always greater than the cheaper non-fluorinated halogenated phenols, there is a greater retention of activity in a non-ionic cream base.

N.B.—The proprietary products cited in the last table have the following active constituents:

Cream A—Chlorinated 8 hydroxy quinolines 0.3%, menthol 0.6%, methyl salicylate 0.1%.
Cream B—Chlorophenesin.
Cream C—Diamthazole di-hydrochloride.
Cream D—0.05% phenyl mercuric nitrate.
Cream E—Undecylenic acid.

What is claimed is:
1. A chemical compound of formula p-X—$C_6F_4$—OH where X is chosen from the group consisting of chlorine, bromine and iodine.
2. p-Chlorotetrafluorophenol, $ClF_4OH$.
3. p-Bromotetrafluorophenol, $BrC_6F_4OH$.
4. p-Iodotetrafluorophenol, $IC_6F_4OH$.
5. A method for the preparation of a compound of formula X—$C_6F_4$—OH where X is chosen from the group consisting of chlorine, bromine and iodine comprising the steps of mixing a compound of formula $C_6F_5X$ wherein X has the same meaning as in the preceding formula and potassium hydroxide in tertiary butanol solution and heating the resulting homogeneous mixture at a temperature up to reflux.
6. A method for the preparation of a compound of formula X—$C_6F_4$—OH where X is chosen from the group consisting of chlorine, bromine and iodine comprising the steps of mixing a compound of formula $C_6F_5X$ wherein X has the same meaning as in the preceding formula and an alkali metal hydroxide in alcoholic solution and heating the resulting homogeneous mixture at a temperature up to reflux.

References Cited

UNITED STATES PATENTS 1,992,154 2/1935 Britton et al. _____ 260—629
2,799,713 7/1957 Widiger et al. _____ 260—629

OTHER REFERENCES

Bolto et al., "Chem. Soc. J.," pt. 3 (1955), pp. 2926–2929.

Liveris et al., "Chem. and Industry," July–Sept., 1957, pp. 954–5.

Wall et al. "U.S.N.B.S. Jour. Research Phys. and Chem." (1963), vol. 67A, pp. 481–497.

LEON ZITVER, *Primary Examiner.*

BERNARD HELFIN, *Examiner.*

W. B. LONE, *Assistant Examiner.*